United States Patent [19]

Bates et al.

[11] Patent Number: 5,176,864
[45] Date of Patent: Jan. 5, 1993

[54] LOST WAX PROCESS UTILIZING A HIGH TEMPERATURE WAX-BASED MATERIAL

[75] Inventors: Calvin Bates, Monroeville; Linda Gaydosik, New Kensington, both of Pa.

[73] Assignee: Aluminum Company of America, Pittsburgh, Pa.

[21] Appl. No.: 364,135

[22] Filed: Jun. 12, 1989

[51] Int. Cl.$^5$ .................. B29C 67/14; B29C 33/76
[52] U.S. Cl. ................... 264/137; 106/38.8; 264/221; 264/257; 264/317
[58] Field of Search ............. 264/257, 258, 317, 135, 264/136, 137, 221; 106/38.25, 38.8, 622, 270

[56] References Cited

U.S. PATENT DOCUMENTS

| | | | |
|---|---|---|---|
| 2,755,216 | 7/1956 | Lemons | 154/110 |
| 3,854,962 | 12/1974 | Speyar | 106/38.8 |
| 4,155,970 | 5/1979 | Cassell | 264/137 |
| 4,248,817 | 2/1981 | Frank | 264/317 |
| 4,712,605 | 12/1987 | Sasaki et al. | 164/516 |
| 4,786,347 | 11/1988 | Angus | 156/172 |
| 4,826,645 | 5/1989 | Angus | 264/277 |
| 4,863,660 | 9/1989 | Cahuzac et al. | 264/317 |

Primary Examiner—Jay H. Woo
Assistant Examiner—Robert B. Davis
Attorney, Agent, or Firm—David W. Pearce-Smith

[57] ABSTRACT

The present invention is a wax-based material for use in the lost wax process where the wax must be capable of withstanding temperatures of up to 350° F., the wax-based material including: (a) a high temperature brittle wax; (b) about 5-30 wt % organic plasticizer including polyfunctional amines and alcohol amines and (c) about 5-10 wt % paraffin wax.

12 Claims, 2 Drawing Sheets

LOST WAX PROCESS UTILIZING A HIGH TEMPERATURE WAX-BASED MATERIAL

FIELD OF THE INVENTION

The present invention relates to the fabrication of articles by the lost wax process. More particularly, it is directed to a high temperature wax-based material for use in the lost wax process.

BACKGROUND OF THE INVENTION

The lost wax process is said to date back to antiquity. Essentially, the process involves fabricating an expendable model of the object sought to be cast from metal. This pattern, made from material such as wax which is typically meltable or dissolvable, is surrounded with ceramic mold material (the "investment") which has the property of being able to retain its shape. After the ceramic material is formed, the wax pattern is melted out, thereby leaving within the ceramic material a cavity having the contour of the part sought. Of course, proper compensation is made for solidification shrinkage of the pattern material and molten metal.

A variation of the lost wax process has been found to be especially useful in the construction of ultra-lightweight radomes. In this application, the part sought to be made is hollow and the walls of the article are formed around and supported by the wax mold. After the material used to form the hollow article has hardened, the article is heated and the wax melts with little or no wax coating the inner wall of the cast article.

To provide a lightweight radome with good transmission characteristics, sandwich structures are commonly used. The core of the sandwich structure is usually of honeycomb, foam, or fluted core. The facings of the sandwich are normally composed of a binder of polyester, epoxy or polyimide resin reinforced with a glass or fused silica cloth. New methods for fabricating radomes that will operate at temperatures of 500° F. to 700° F. and possibly up to 1000° F. are required. These temperature requirements are created by aerodynamic heating of radomes due to high speed of aircraft and by RF power absorption heating by high power electronic countermeasures antennas. Radomes constructed with honeycombs and adhesive films are presently limited for long-term exposure to temperatures less than 500° F. Honeycomb core radomes, even for low temperature applications, have had a history of moisture entering the cells through pin holes or damaged areas in the facings. The moisture can then migrate through large sections, causing structural and antenna pattern degradation. Physical damage to the radome occurs if the water freezes in the cells and expands.

The problems with the honeycomb core become more acute with high temperature radomes because the high temperature resins are more porous and more difficult to seal. In this later case, the moisture penetrating the core can be converted to ice at low temperatures or steam if the radome temperature exceeds the boiling point of water.

The type of process having the greatest potential for high temperature sandwich radomes is the fluted core process. This process provides the channels necessary for moisture drainage, air expansion and convection cooling of the radome wall. This process also allows the same resin used in the facings to be used in the core and allows the parts to be fabricated in a single stage.

U.S Pat. No. 2,755,216 issued to Lemons describes a process for forming a multi-ducted shell for use as a radome. The multi-ducted shell has an ultra-lightweight construction and is made out of fiberglass or other glass cloth sheet material impregnated with a thermosetting resin. The impregnated sheet is easily formable while wet and the thermosetting resin cures in situ around the wax mold into a final rigid shape at a temperature below the softening or melting temperature of the wax (125°-225° F.).

U S. Pat. No. 4,155,970 issued to Cassell describes a method for making a hollow composite using a destructible core. Cassell recognizes that the process described in U.S. Pat. No. 2,755,216 issued to Lemons, discussed supra, is unsuitable for high temperature radomes because candidate waxes melt at about 125° F. and the high temperature resins harden at about 325°-350° F. Cassell, therefore, uses a heat shrinkable material, such as polytetrafluoroethylene (PTFE), to surround a lead core. This allows lead to be used instead of wax. Lead has been found to be a good material for lost wax casting because it (a) holds its cross-sectional area, (b) is sufficiently malleable to form the radome contours, and (c) has a melting temperature within the proper range for proposed resin curing. The PTFE coating was required because when an uncoated lead mandrel was used as a mandrel to construct the hollow core, small particles of lead were left in the radome following its melting and removal. These lead particles were found to have a deleterious effect on the electronic transmission and reception of the radome.

The primary problem with PTFE mandrels is in their removal after molding the fluted sandwich construction. A very slight depression or dent in the panel may cause the removal force to be increased above the strength of the composite and rupture can occur. In this case, the column wall thickness would have to be increased above service load requirements to accommodate mandrel removal.

U.S. Pat. No. 4,712,605 issued to Sasaki et al describes a process for producing hollow cast articles. The process comprises the steps of preparing a first lost model having an outer contour substantially corresponding to a desired interior contour of the finished product, depositing a metallic or ceramic material or a mixture thereof over the surface of the first lost model by spraying to form a layer defining a hollow core block, placing the hollow core block in a first mold, pouring a material for forming the second lost model into the first mold, coating a refractory material over the second lost model to form a second mold for casting, removing the second lost mold to form a cavity, casting a molten metal or alloy into the cavity and staving the mold to take out a finished product.

It would be advantageous, therefore, to provide a wax-based material that could be used at temperatures of up to 350° F. without melting or softening sufficiently to deform.

The primary object of the invention is to provide a wax-based material that could be used at temperatures of up to 350° F. to form ultra-lightweight radomes.

Another object of the present invention is to provide a material that could be used at temperatures of up to 350° F. that does not require the use of metallic particles, such as lead particles, which have been found to have a deleterious effect on the electronic transmission and reception of the radome.

Additional objects and advantages of the invention will be more fully understood and appreciated with reference to the following description.

SUMMARY OF THE INVENTION

The present invention is a wax-based material for use in the lost wax process where the wax must be capable of withstanding temperatures of up to 350° F., said wax-based material including: (a) a high temperature brittle wax; (b) about 5-30 wt % organic plasticizer; and (c) about 5-10 wt % paraffin wax.

In the preferred embodiment of the present invention, the wax-based material includes: (a) a high temperature brittle wax; (b) 5-10% dioctyl phthalate; (c) 5-20% ethyl vinyl acetate; and (d) 5-10% paraffin wax containing a homolog range of $C_5$ to $C_{50}$.

In a second aspect of the present invention, the wax-based material is used in a method for making a hollow composite structure comprising the steps of: (a) forming a meltable mandrel with fixed rectangular cross section; (b) covering the enclosed mandrel with fiber-reinforcing material; (c) impregnating the fiber reinforcement with curable binder; (d) curing the binder in the fiber-reinforcing material, thereby forming said hollow composite structure; and (e) melting the mandrel with heat and removing the melted mandrel.

A third aspect of the present invention is a lost wax method for making a radome that does not require a facing so that it can be used at temperatures in excess of 500° F. The method includes the steps of: (a) forming a wax-based mandrel capable of withstanding temperatures of up to 350° F. without melting; (b) coating the mandrel with a thermoplastic resin containing a fiber-reinforcing material; (c) curing the thermoplastic material; and (d) melting the mandrel with heat to thereby form the radome composite structure.

BRIEF DESCRIPTION OF THE DRAWINGS

Other features of the present invention will be further described or rendered obvious in the following related description of the preferred embodiment of the invention which is to be considered together with the accompanying drawings wherein like figures refer to like parts and wherein.

MODE FOR CARRYING OUT THE INVENTION

Figure 1:
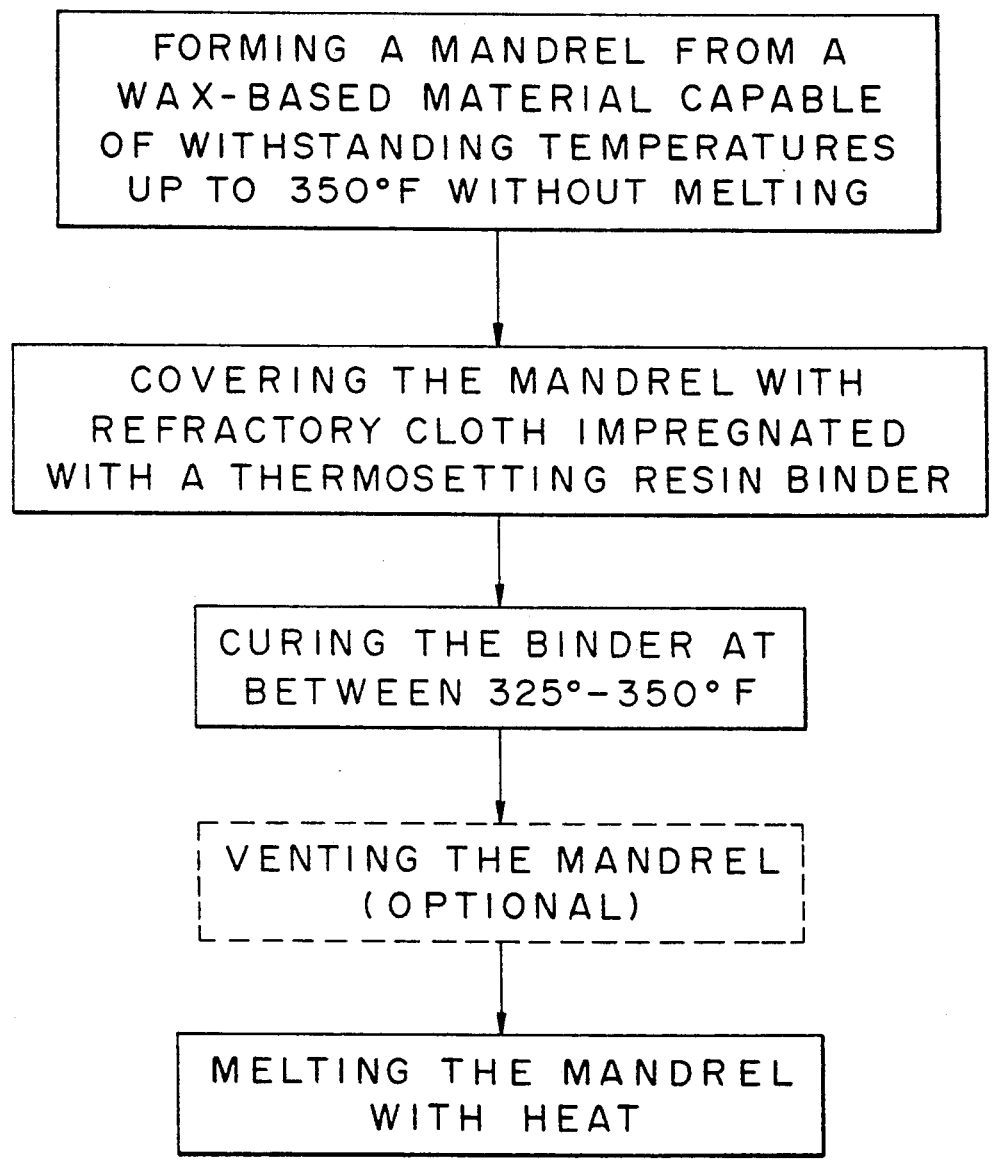
FIG. 1 is a flow diagram showing the steps involved in fabricating the hollow composite structure of the present invention.

The manufacture of the improved hollow fluted cores of the present invention is achieved by the steps shown in the flow diagram of FIG. 1 and FIG. 2.

Turning first to FIG. 1 there is illustrated a flow diagram showing the steps involved in fabricating the hollow composite structure of the present invention. The basic steps used in the present invention are as follows: providing a mandrel; covering the mandrel with fiber reinforcing cloth which has been impregnated with a thermosetting binder; curing the binder; and melting the mandrel with heat to remove the wax.

FIG. 2 is a pictorial representation of the steps described in FIG. 1. Mandrel 10 is formed from a wax-based material. The size and shape of mandrel 10 is structurally similar to other wax mandrels known and used in the art. One skilled in the art will recognize that the specific part that is to be fabricated will determine the size and shape of the mandrel which is used. However, the composition of mandrel 10 is unique. Mandrel 10 possesses a high melting point, about 350° F., and it is also extrudable. Previously, high temperatures waxes have not been useful in the art because they were brittle. A general rule of thumb in the art is that the higher the melting point of the wax, the more brittle and less extrudable it is.

Mandrel 10 is made from a wax-based material comprised of a high temperature brittle wax; 5-10% of a plasticizer selected from the group of polyfunctional amines, alcohol amines and polyhydric aliphatic alcohols; 5-10% paraffin wax containing a homolog range of $C_5$ to $C_{50}$; and 5-20% ethyl vinyl acetate. A preferred plasticizer is dioctyl phthalate. The term "high temperature wax" is used herein to refer to waxes which melt at about or above approximately 160° C. One such high temperature wax is ROSS WAX 160 which is commercially available from Frank Ross Co., 60-14 Ash Street, Jersey City, N.J.

High temperature waxes are generally aromatic polyester-polyamides which are very brittle at room temperature. Modification of these waxes into an extrudable and flexible material with no appreciable change in physical properties was accomplished by compounding. The compounding of the wax is done by adding dioctyl phthalate (5-10%), paraffin wax with a homolog range of $C_5$ to $C_{50}$ (5-10%) and ethyl vinyl acetate (5-20%). The percentages of compounding agents were added on a weight to weight basis.

The mixing of the wax and the compounding agents is done with high shear mixing, ~25 mmHg of vacuum and at 10°-30° C. above the melt temperature (160° C.) of the wax. The compounded/modified wax is cooled at ~18° C./hour until the solidification temperature is reached. This modified wax is then mixed on a twin roll mixer at 50° C. to obtain uniformity in the material for extrusion.

The wax-based material of the present invention is useful in lost wax processes in that it can be extruded into the desired shapes and it melts at temperatures about 350° F. As Cassell recognized in U.S. Pat. No. 4,155,970, discussed above, prior art wax-based materials are unsuitable for the production of high temperature radomes because candidate waxes melt at about 125° F. and the high temperature resins that are needed harden at about 325°-350° F. The melting of the wax below the curing temperature of the resin means that the material can not be used in lost wax casting because it does not hold its cross-sectional shape long enough for the resin to cure. The inadequacies of present mandrel materials can result in (1) the inability to fabricate parts that are used at higher temperatures; and (2) an increase in the time that is required to produce parts and/or a limit in the complexity of composite parts design.

The wax-based material used to form mandrel 10 is also extrudeable at room temperature. The extrudability of the wax-based material is required for a material to be used in commercial production. Good extrudability is required to mass produce mandrels for use in the multi-duct applications. These applications include radomes and other ultra-lightweight fluted articles. In addition, the wax-based material must be sufficiently malleable at room temperature to form the contours of the piece.

Figure 2A:
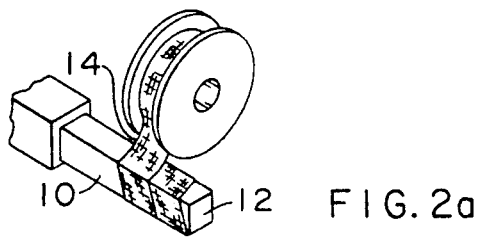
FIGS. 2a-2e are a pictorial representation of the steps described in FIG. 1.

FIG. 2a shows mandrel 10 being covered with a fiber-reinforcing material such as cloth tape 14. Mandrel 10 has an end 12. Tape 14 is spirally wrapped around mandrel 10 and end 12 and the other end opposite end 12 are normally left uncovered by tape 14.

Tape 14 is a refractory tape impregnated with a thermosetting resin. Tape 14 may be a cloth made of fiberglass or ceramic fiber such as SiC, graphite or KEVLAR. Alternative methods of covering mandrel 10 are "dipping" it in a plastic self-curing substance containing fibers of ceramic materials or spraying or painting a fiber-containing coating onto its surface. The technique used to apply the coating is not critical to practicing the present invention. However, as will be discussed more fully below, it is important that end 12 and its opposite end are left sufficiently uncoated to permit the melted wax to flow out. If desired, the ends of the mandrels may be coated and a hole may be drilled in each end of the mandrel to permit melted wax to flow out of the cured fiber-containing coating.

Figure 2B:
Figure 2B:
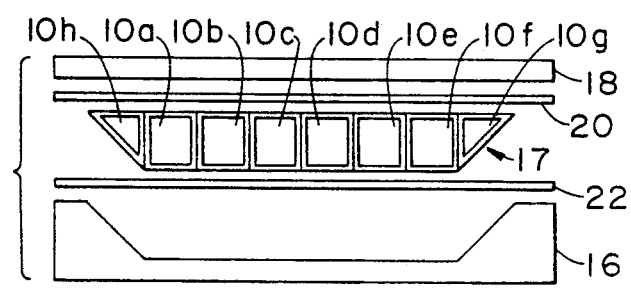

FIG. 2b shows an exploded view of the components that are formed into a fluted core. Forming is accomplished by first aggregating a number of individual mandrels to form a multi-mandrel structure 17. The multi-mandrel structure need not be a single unit. Multi-mandrel structure 17 is an aggregate of mandrels 10a, 10b, 10c, 10d, 10e and 10f, which have a rectangular cross-section and mandrels 10g and 10h which have a triangular cross-section.

Next, multi-mandrel structure 17 is placed into a mold for forming the outer wall of the fluted core. The multi-mandrel structure is placed in a partable mold comprising a bottom mold section 16 and a top mold section 18. A top skin 20, bottom skin 22 are placed in around the mandrels. Skins 16 and 18 are also impregnated with thermosetting binder and they act to form the outer wall 24 and flanges 26 and 28 of the fluted core. In addition parting layer may be used to facilitate the removal of an article formed by the lost wax process from the mold. Some materials that are contemplated for use as a parting layer in the present invention include porous teflon film, teflon spray and any other release agent known to the art.

The thermosetting binder used is made from a higher temperature thermosetting resin than has been previously used with wax mandrels. In the past, extrudable waxes would melt at about 125° F. and the high temperature resins would harden at about 325°-350° F. As stated above, the melting of the wax below the curing temperature of the resin means that the material cannot be used in lost wax casting because it deforms before the resin is cured. Polyimide, polyester alkyd type resins, bismaleimide resins, low curing temperature ceramic matrices such as aluminum phosphate bonded composite materials, and high temperature epoxy resins are some examples of higher temperature resins that may be employed in practicing the present invention. The curing temperature of the binder is its critical feature in the present invention, not its composition.

As discussed above, the resins contemplated for use in the present invention will operate at temperatures of 500° F. to 700° F. and possibly up to 1000° F. These temperature requirements are created by aerodynamic heating of radomes due to high speed of aircraft and by RF power absorption heating by high power electronic countermeasures antennas. Lower temperature resins of the type used with prior art waxes, are unsuitable for use at these higher temperatures. The use of higher temperature resins also permits the same resin used in the facings of the radome to be used in the core and allows the parts to be fabricated in a single stage. This results in a significant reduction in the overall processing time.

Figure 2C:
Figure 2C:
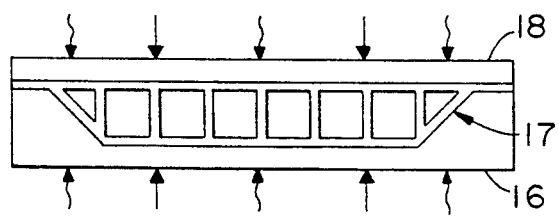

After the multi-mandrel structure 17 is placed on top of bottom skin 22, top skin 20 is placed thereon and top mold section on top of the top skin. FIG. 2c depicts curing the binder to effect the formation of a single unit containing the wrapped mandrels. The binder material is cured by applying heat and pressure to top mold 20 and bottom mold 22. The heat and pressure in FIG. 2c is shown as arrows. FIG. 2c may involve merely allowing multi-mandrel structure 17, top skin 20 and bottom skin 22 to contact under suitable temperatures and pressures—usually of the order of 350° F. for a period of time of the order of 16 hours at the end of which step the laterally contacting portions of the tubular member are in a mutually integrated condition.

After curing the thermosetting resin, the multi-mandrel structure may optionally be vented. The mandrel is vented to prevent overheating of the wax. Overheating causes the wax to decompose and also causes fumes.

Figure 2D:
Figure 2D:
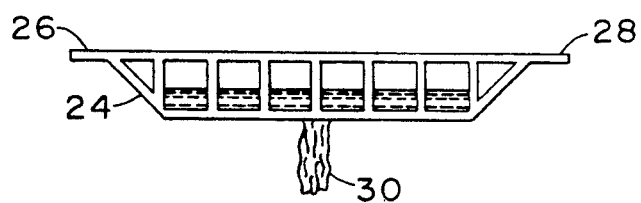
Figure 2E:
Figure 2E:
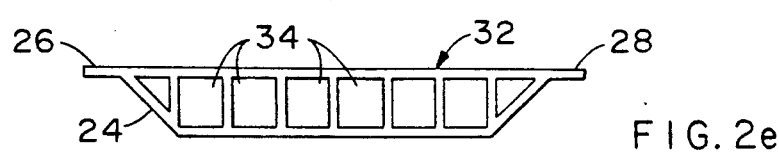

FIG. 2d shows the final step in producing the fluted core sandwiches of the present invention. The step of FIG. 2d consists of raising the temperature of the mold to above the curing temperature of the resin so that molten wax 30 will flow from the multi-mandrel structure. The wax-based mandrel melts and leaves a fluted core structure 32 which has a plurality of hollow cores 34, shown in FIG. 2e. Hollow cores 34 are formed when molten wax 30 is drained from the cured multi-mandrel structure. This is the so-called "lost wax" step in the process in which the mandrels are removed from the assembly by heat.

To effect the removal of the wax from the cured multi-mandrel structure, the ends of the mandrel are not covered with impregnated cloth. The partable mold contains drain holes that permit the melted wax to drain from the cured multi-mandrel structure.

It is to be understood, however that even though the advantages and characteristics of the present invention have been set forth in the foregoing description, the disclosure is only illustrative. The scope of the present invention is indicated by the broad general meaning of the terms in which the following claims are expressed.

What is claimed is:

1. A method for making a hollow composite structure that will maintain its integrity at temperatures of up to about 1000° F., the method comprising the steps of:
   (a) forming a wax-based mandrel capable of withstanding temperatures of up to 350° F. without melting made from a wax-based material consisting essentially of
      (i) a high temperature brittle wax;
      (ii) about 5–10 wt % plasticizer selected from the group consisting of polyfunctional amines and alcohol amines and
      (iii) about 5–10 wt % paraffin wax;
   (b) covering said mandrel with a fiber-reinforcing material;
   (c) impregnating said fiber-reinforcing material with curable binder;
   (d) curing said binder; and
   (e) melting said mandrel with heat to thereby form said hollow composite structure.

2. The method of claim 1 which further includes the steps of:
   placing said wrapped mandrel in a mold; and
   filling said mold with a thermosetting resin.

3. The method of claim 1 in which said step of covering said mandrel with a fiber-reinforcing material includes:
wrapping refractory cloth around said mandrel, said refractory cloth selected from the group consisting of glass fiber and ceramic fibers.

4. The method of claim 1 in which said step of impregnating said fiber-reinforcing material with curable binder includes:
impregnating said fiber-reinforcing material with thermosetting resins selected from the group consisting of polyester resins and alkyd type resins.

5. A method for making a hollow composite structure that will maintain its integrity at temperature of up to about 1000° F., the method comprising the steps of:
(a) forming a wax-based mandrel capable of withstanding temperatures of up to 350° F. without melting made form a wax-based material comprising:
(i) a high temperature brittle wax;
(ii) bout 5-10 wt % plasticizer selected from the group consisting of polyfunctional amines and alcohol amines; and '(iii) about 5-10 wt % paraffin wax;
(b) applying a coating of thermosetting resin containing fibers of ceramic materials on said mandrel;
(c) curing said thermosetting resin; and
(d) melting said mandrel with heat to thereby form said hollow composite structure.

6. The method of claim 5 in which said step of applying a coating of thermosetting resin includes:
dipping said mandrel in a solution of thermosetting resin containing fibers of ceramic materials to form a coating on said mandrel.

7. The method of claim 5 in which said step of applying a coating of thermosetting resin includes:
spraying a fiber-containing coating onto the surface of said mandrel.

8. The method of claim 5 in which said step of curing said thermosetting resin includes:
heating said thermosetting resins up to 350° C. to cause said resin to cure.

9. The method of claim 5 in which said step of melting said mandrel with heat to thereby form said hollow composite structure includes:
heating said mandrel above to 350° F. to cause said wax to melt and drain from said cured resin.

10. A lost wax method for making a randome that does not require a facing so that it can be used at temperatures in excess of 500° F., the method comprising the steps of:
(a) forming a wax-based mandrel capable of withstanding temperatures of up to 350° F. without melting made from a wax-based material comprising:
(i) a high temperature brittle wax;
(ii) about 5-10 wt % plasticizer selected from the group consisting of polyfunctional amines and alcohol amines; and
(iii) about 5-10 wt % paraffin wax;
(b) coating said mandrel with a thermoplastic resin containing a fiber-reinforcing material;
(c) curing said thermoplastic material; and
(d) melting said mandrel with heat to thereby form said randome composite structure.

11. The method of claim 1 in which said step of covering said mandrel with a fiber-reinforcing material includes:
wrapping refractory cloth around said mandrel, said refractory cloth is formed from fibers selected from the group consisting of SiC, graphite and combinations thereof.

12. The method of claim 1 in which said step of covering said mandrel with a fiber-reinforcing material includes:
wrapping KEVLAR cloth around said mandrel.

* * * * *